W. W. BRADLEY.
MACHINE FOR MAKING BEAD CHAINS.
APPLICATION FILED FEB. 9, 1915.

1,169,610.

Patented Jan. 25, 1916.
6 SHEETS—SHEET 5.

Fig. 5.

WITNESSES

INVENTOR
W. W. Bradley
BY
ATTORNEY.

W. W. BRADLEY.
MACHINE FOR MAKING BEAD CHAINS.
APPLICATION FILED FEB. 9, 1915.

1,169,610.

Patented Jan. 25, 1916.
6 SHEETS—SHEET 6.

WITNESSES:

INVENTOR
W. W. Bradley
By Howard P. Denton
ATTORNEY.

UNITED STATES PATENT OFFICE.

WILLIAM W. BRADLEY, OF SYRACUSE, NEW YORK, ASSIGNOR OF ONE-HALF TO WILLIAM L. DAY, OF SYRACUSE, NEW YORK.

MACHINE FOR MAKING BEAD CHAINS.

1,169,610.  Specification of Letters Patent.  Patented Jan. 25, 1916.

Application filed February 9, 1915. Serial No. 7,132.

*To all whom it may concern:*

Be it known that I, WILLIAM W. BRADLEY, a citizen of the United States, and resident of Syracuse, in the county of Onondaga, in the State of New York, have invented new and useful Improvements in Machines for Making Bead Chains, of which the following, taken in connection with the accompanying drawings, is a full, clear, and exact description.

This invention relates to certain improvements in machines for making bead chains in which a continuous wire and a continuous strip of metal are intermittingly fed into the machine and formed, respectively, into links and beads which are applied to the heads of the links to emerge from the machine as a complete bead chain, and to this extent is somewhat similar to that shown in my Patent No. 1,130,253, Mar. 2, 1915, except that links are cut or turned to form round heads by means of a rotary cutter of the class shown in my pending application, Serial No. 846,763, filed June 23, 1914, and also in the wire and strip feeding mechanisms for forming and applying the beads to the heads of the links as will be more fully pointed out in the subsequent description.

These chains are used extensively in connection with incandescent lamp sockets for operating the switches therein and also for operating the valves of gas jets, electric igniters and similar uses, and the main object of my present machine is to increase the strength and flexibility of the chain without excessive waste of material by turning the central portions of the wire links to a reduced size sufficient to form round end heads thereon of the same diameter as the wire and by progressively applying the cupped bead blanks to adjacent heads in such manner as to firmly connect the links and reduce the liability of the heads pulling through the open ends of the beads.

Another object is to enable the link-wire and bead-strip to be fed in parallelism into the machine so as to reduce the floor space necessary for such machine.

Other objects and uses relating to specific parts of the machine will be brought out in the following description.

As illustrated, this machine comprises a wire feeding mechanism, a rotary cutter through which the wire is fed for cutting said wire into links and forming heads thereon, mechanism for feeding the sheet metal strip from which the bead blanks are to be cut, dies for cutting and cupping the bead blanks, mechanism for feeding the cupped blanks into position to be applied to the heads of the links, and dies for closing the cupped blanks around and upon the links, and a driving shaft from which the various mechanisms derive motion. These various mechanisms are preferably mounted within or upon a suitable supporting frame —1— having an upright bracket —2— extending some distance above the main supporting bed or table —3— for receiving and supporting a main driving shaft —4— and other parts of the machine presently described, said shaft being provided with a pulley —5— adapted to be connected by a belt to any available source of power, not illustrated, for driving said shaft continuously in one direction.

Figures 2, 12:
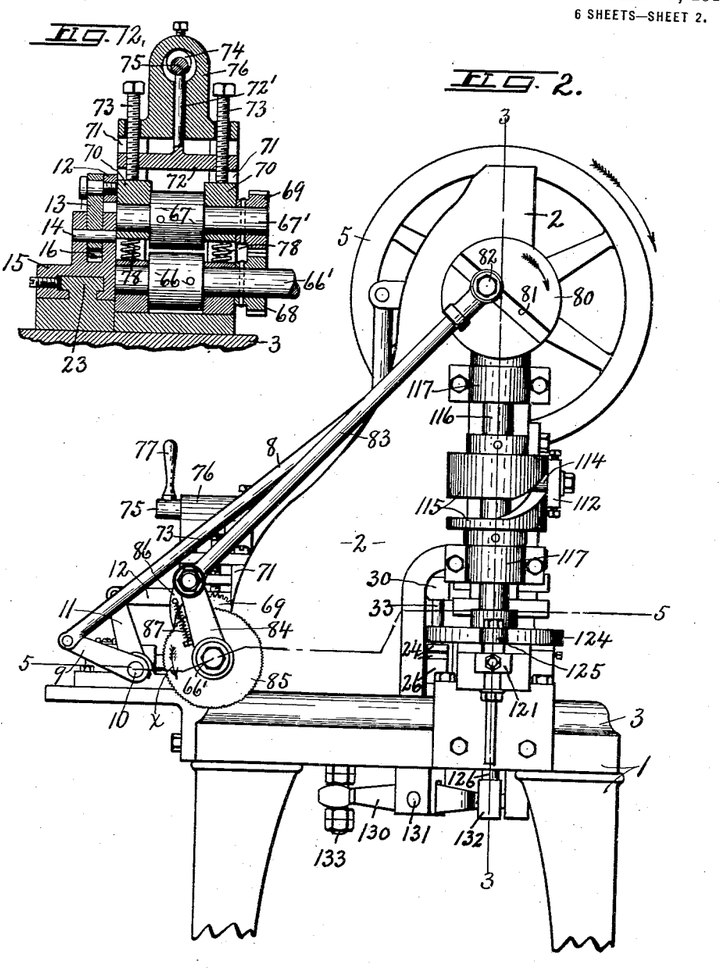
Fig. 2 is a side elevation of the same machine.
Fig. 12 is an enlarged longitudinal vertical sectional view through the bearings for the strip feeding rollers and driving means therefor, the rollers being shown in elevation.
Figure 5:
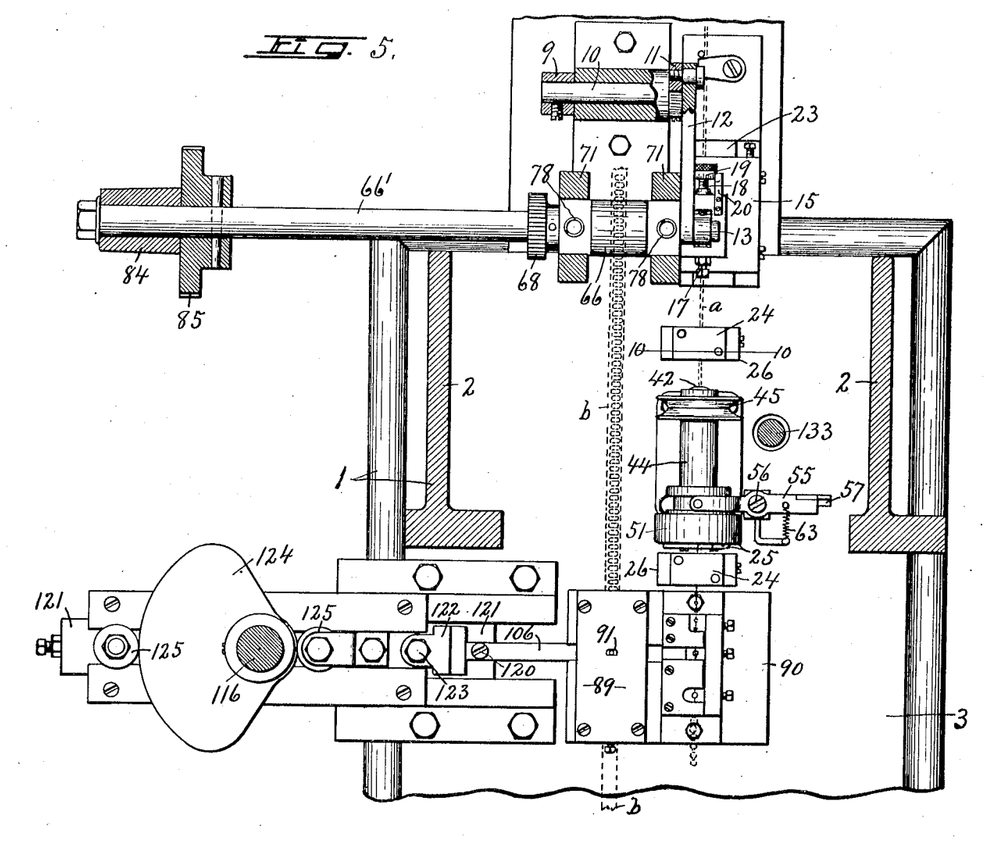
Fig. 5 is an enlarged horizontal sectional view taken approximately in the plane of line 5—5, Fig. 2.
Figure 6:
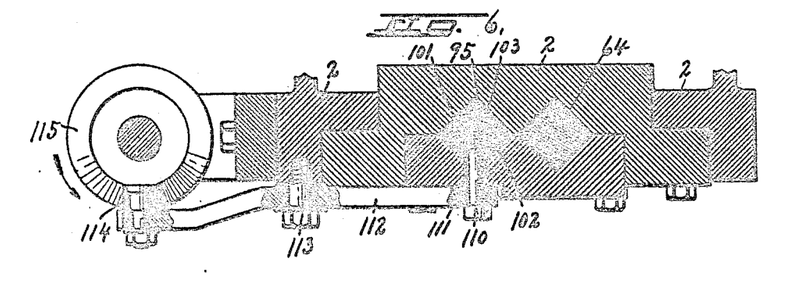
Fig. 6 is an enlarged detail horizontal sectional view taken on line 6—6, Fig. 1.
Figure 7:
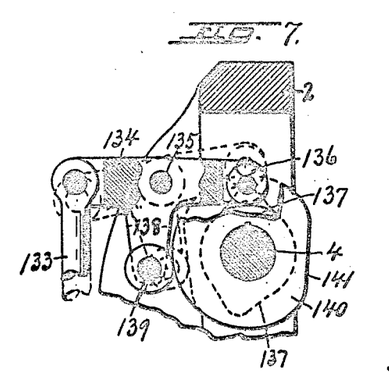
Figs. 7, 8, 9 and 10 are enlarged detail sectional views taken, respectively, on lines 7—7, 8—8, and 9—9, Fig. 1 and 10—10, Fig. 5.

*Wire feeding mechanism.*—Secured to the shaft —4— is an eccentric disk —6— having its periphery engaging a pair of rollers —7— on the adjacent end of a downwardly and inwardly inclined pitman —8—, the lower end of which is pivoted to a crank-arm —9— on a rock shaft —10— which is journaled in a suitable bearing on the rear end of the table —3—, as shown more clearly in Figs. 2 and 5. Another crank-arm —11— is secured to the opposite end of the rock shaft —10— and is connected by a link —12— to the upper end of an upright wire-gripping-and-feeding-pawl —13— which is pivoted at —14— to a sliding block —15— and is provided at its lower edge with a biting edge —16— below the pivot —14— to coöperate with the adjacent face of the sliding block —15— for gripping and feeding the wire in a manner presently described.

The forward and rearward rocking movement of the wire gripping pawl —13— is limited by adjustable limiting stops or screws —17— and —18—, one of which is provided with circumferential graduations —19— coöperating with an index finger —20— to determine accurately the amount of rocking movement of the pawl and also the amount of movement of the sliding block —15—.

The upper face of the base of the sliding block —15— forms a guide for the wire as —a— (indicated by dotted lines) which is also passed through a guide tube —21— on the rear end of the block just at the rear of the pawl —13— and in horizontal alinement with the upper face of the base of the sliding block, the biting edge —16— of the pawl being in sufficiently close proximity to the guide face on the block —15— to cause it to grip the wire when rocked forwardly and to release it when rocked rearwardly.

The upper end of the pitman —8—, carrying the rollers —7— which coöperate with the eccentric —6—, is provided with an elongated slot —22— for receiving the main driving shaft —4— and also to guide the pitman in its reciprocatory movement as produced by the engagement of the periphery of the eccentric disk with the rollers —7—. The eccentric throw of this disk and connections between the pitman —8— and rock shaft —10— is such as to cause the pawl —13— and sliding block —15— to feed the wire forwardly the length of one link at each rotation of the disk —6— or driving shaft —4—.

Figures 4, 11:
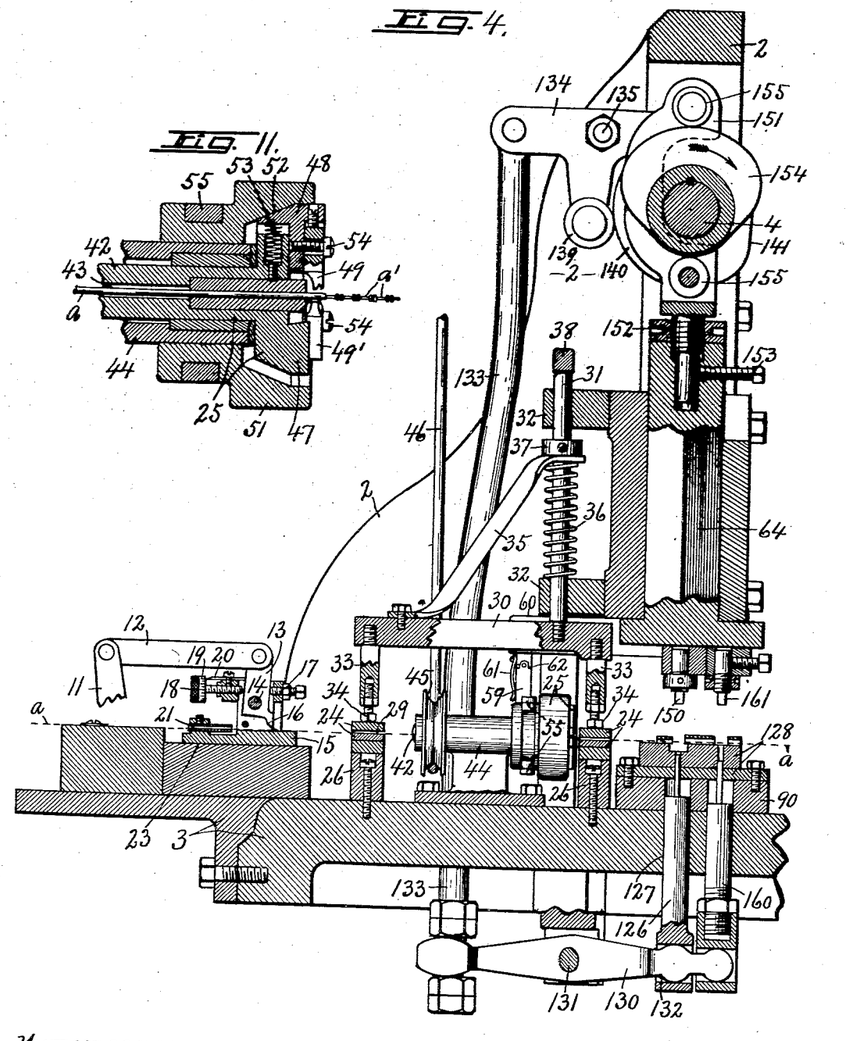
Fig. 11 is an enlarged sectional view of the cutting end of the rotary cutter, showing also a portion of the wire and links cut therefrom.

The adjustable stops —17— and —18— are set so as to allow a limited forward movement of the pawl —13— independently of the sliding block —15— to cause the biting edge —16— to grip the wire with sufficient firmness to feed it forward without liability of cutting or marring such wire, and at the end of such independent movement to engage the stop pin —17— and thereby feed the sliding block —15— forwardly one link space, the sliding block —15— being mounted upon suitable ways —23— on the rear end of the table —3—, as shown in Figs. 4 and 5. At the end of this forward movement of the wire, the latter is temporarily gripped and held against endwise movement while the sliding block —15— and pawl —13— are being returned to their starting positions, during which time the pawl —13— is rocked against the stop —18— to release its biting edge from engagement with the wire, and this engagement of the pawl —13— with the stop —18— causes the sliding block —15— to be withdrawn rearwardly along the wire in order to repeat the feeding operation previously described.

Figure 10:
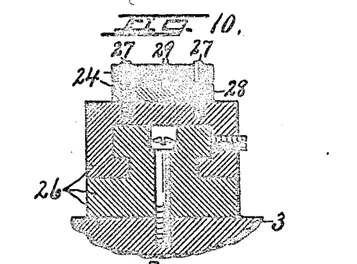

The means for temporarily gripping and holding the wire against endwise movement while the feeding device is being returned comprises separate pairs of gripping jaws —24— located at opposite ends of a rotary-link-forming-cutter —25—, the lower jaws being mounted upon suitable standards —26— rising from the table with their gripping faces in horizontal alinement with the axis of the rotary cutter —25— and guide tube —21—, while the upper gripping members —24— of each set are movable vertically on guide pins —27— and are normally forced apart from the lower gripping members by coil springs —28— arranged in the manner shown in Fig. 10, the adjacent faces of the gripping members —24— of each pair being provided with registering grooves —29— to receive and guide the wire and links to and from the cutter.

The means for operating the jaws —24— against the action of their retracting springs —28— consists of a cross head —30— having an upright supporting rod —31— guided in suitable ways —32— and provided with pendent studs —33— carrying adjustable bearing members —34— in the form of screws which rest upon the upper faces of the jaws —24—, said rod —31— being secured to the cross head —30— near one end and is connected to the opposite end by a brace-bar —35—, as shown more clearly in Fig. 4.

Figure 8:
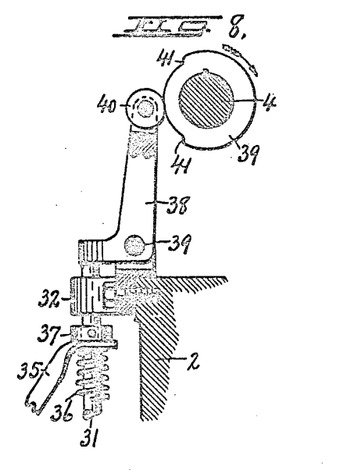
Figure 9:
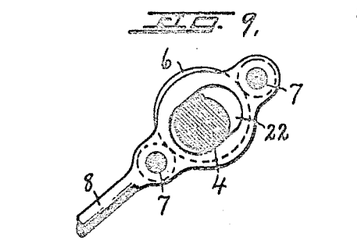

The cross head —30— is normally elevated to release the upper jaws —24— by a retracting spring —36— coiled around the rod —31— between the lower bearing member —32— and a shoulder —37— on said rod and is forced downwardly against the action of the retracting spring to close said jaws by means of a bell crank lever —38— and a cam —39—, shown more clearly in Fig. 8, the lever —38— being pivoted at —39— in an upright position to a suitable bracket on the upright arm —2— of the main supporting frame and has its lower arm resting loosely upon the upper end of the rod —31— and its upright longer arm provided with a roller —40— engaging with the periphery of the cam —39— and is held in this engagement by the spring —36— through the medium of the rod —31—.

It is only necessary to move the upper jaws —24— of the wire gripping device a very slight distance to grip and release the wire, but this movement must be almost instantaneous at the proper time, and for this purpose the cam —39— is provided with relatively shallow abrupt shoulders —41— connecting concentric portions of the cam of different radii and also of different circumferential length, that of the shorter radius being of less length than that of the longer radius to allow the jaws —24— to open while the wire is being fed forward, the advancing shoulder —41— being timed so as to close the jaws at the instant the wire feeding device reaches the limit of its forward movement, while the concentric portion of the cam of longer radius operates to hold the jaws closed while the wire is being operated upon by the cutter —25— to form the links and also while the wire feeding device is being returned.

*Link cutting device.*—The cutting device —25— is the same as that which is shown and described in my pending application, Serial No. 846,763, previously referred to, in that it is provided with a tubular shaft —42— having a central lengthwise passage —43— therethrough through which the wire is advanced by the feeding mechanism previously described, said shaft being journaled in a suitable bearing —44— on the bed or table —3— of the main supporting frame and is provided with a pulley —45— adapted to be connected by a belt —46— to any available source of power, not shown, for driving the shaft at a high rate of speed. The front end of the shaft —42— is provided with an enlarged conical head —47— constituting a tool holder having radial guide-ways on its front end face for receiving radially movable jaws —48— carrying suitable cutting tools —49— and —49'— by which the wire is cut nearly through in short lengths or links, and the central portion of each link reduced in diameter to form end heads thereon, as shown in Fig. 11. The outer faces of the jaws —48— are also conical to correspond with the conical periphery of the head —47— and are adapted to be engaged by an axially movable collar —51— which is slidably mounted upon the adjacent end of the bearing —44— and is provided with an inner conical socket —52— bearing upon the conical outer ends of the jaws —48—. These jaws are yieldingly held in engagement with the walls of the conical socket —52— by coil springs —53— (shown in Fig. 11).

The cutting tools —49— and —49'— are adjustably mounted upon the front faces of their respective jaws —48— and held in their adjusted positions by clamping screws —54—.

The object of the sliding collar —51— is to force the jaws —48— inwardly to bring the cutting tools —49— and —49'— into cutting engagement with the wire against the action of the jaw-retracting springs —53— which serve to open the jaws when the collar —51— is withdrawn rearwardly after the cutting operation upon the wire to form the link has been completed.

The means for moving the collar —51— back and forth upon the bearing —44— is shown in Figs. 1, 3, 4 and 5 and consists of a forked-lever —55— of the first kind fulcrumed at —56— upon a suitable post upon the table —3— and has its forked end engaged with a grooved hub on the collar and its opposite end provided with a cam —57— which is adapted to be engaged by a pin —58— on the lower end of an upright pawl —59—, the latter being pivoted to a vertically movable member —60—. This pawl —59— is free to move laterally in one direction against the action of a retracting spring —61—, but is held against movement in the opposite direction by stop shoulders —62—, as shown more clearly in Fig. 4, the object of which is to cause the pin —58— to rock the lever —55— in one direction against the action of a retracting spring —63— to force the jaw-operating collar —51— forwardly for feeding the cutting tools to the work and also to allow the pawl to return across the opposite side of the cam —57— after the cutting operation is completed, at which time the spring —63— returns the collar —51— to its starting position to release the tool-holding jaws, the latter being automatically returned by their springs —53—. This cutting operation is timed to take place while the gripping jaws —24— are holding the wire at both ends of the cutter, and preferably at a time when the cupped bead blanks are being closed upon the heads of previously formed links, so that the plunger which operates the finishing dies may be used to operate the member —60— carrying the pawl —59—, and for this purpose said pawl-carrying member is secured to the operating plunger as —64— for the finishing dies, as shown more clearly in Fig. 3.

*Strip feeding mechanism.*—A sheet metal strip —b— from which the blanks are to be cut is first fed by hand into the front end of the machine through a suitable guide-way —65— parallel with the wire guides and its advance end inserted between feeding rollers —66— and —67— which are secured, respectively, to horizontal parallel shafts on the rear end of the machine. The lower shaft —66'— is journaled in suitable bearings on the main supporting frame or bed —3— and is adapted to be driven intermittently a part of a rotation at a time by suitable mechanism hereinafter described, said shaft being provided with a pinion —68— meshing with a similar pinion —69— on the superposed shaft —67'— which is relatively short and journaled in vertically movable bearings —70—, the latter being guided in vertical ways —71— and normally held down to bring its roller —67— into gripping co-action with the roller —66— by means of a press-head —72—, screws —73— and an eccentric —74—. This eccentric is secured to a rock shaft —75— which is journaled in a cap —76— on the upper end of the ways —71— and is provided with an operating handle —77— by which the rock shaft —75— and its eccentric —74— may be rotated to force the press plate —72— to its operative position for holding the roller —67— in engagement with the roller —66— and also for permitting said press plate to be released to allow the rollers to be separated by means of coil springs —78— which are interposed between the bearings —70— and underlying bearings for the shaft —66'—. For this purpose, the press-plate —72— is guided in the vertical ways —71— and is provided with an upwardly projecting stem —72'— guided in an opening in the under side of the cap —76— and engaged with the periphery of the eccentric —74—.

The screws —73— are passed through vertically registering apertures in the plate —72— and cap —76—, those in the plate —72— being threaded and engaged by the screws —73— which in turn engage the upper faces of the bearings —70,— while the upper portions of the screws are passed loosely through the apertures in the cap —76—.

The object of the screws —73— arranged and operated in the manner described enables the high point of the cam —74— to be brought to the lower side of the rock shaft —75— against the adjacent end of the stem —72'— of the press-plate —72— to lock the latter in its extreme lower position for holding the upper feeding roller —67— in feeding co-action with the lower roller —66—, and on the other hand by turning the cam —74— from its locking position by means of the handle —77— the upper feeding roller may be released from its feeding position, as for example when inserting the strip of metal between the feeding rollers in the initial setting up of the machine.

When the advance end of the strip has been inserted between the feeding rollers in the manner previously described and the upper feeding roller locked in its feeding position, the operation of feeding the strip becomes entirely automatic.

The shaft —66'— upon which the feeding roller —66— is mounted is driven from the main shaft —4—, and for this purpose the main shaft is provided on one end with a disk —80— having a diametric slot —81— in its outer end face for receiving a wrist-pin —82— which is adjustable lengthwise of the slot and when properly adjusted to give the desired throw is firmly secured in place.

A downwardly and rearwardly inclined pitman —83— is connected at its upper end to the wrist-pin —82— and has its lower end pivotally connected to a rock arm —84—, the latter being journaled upon the adjacent end of the shaft —66'— to rock thereon.

Secured to the shaft —66'— is a ratchet wheel —85— adapted to be engaged by a pawl —86— on the rock arm —84— as the pitman —83— is moved in one direction, said pawl being yieldingly held in operative engagement with the teeth of the ratchet wheel by spring —87—, as shown more clearly in Fig. 2.

It is now evident that as the main shaft —4— is rotated continuously in one direction the shaft —66'— will be intermittingly rotated a part of a revolution in the direction indicated by arrow —X—, Fig. 2, to feed the metal strip —b— a trifle more than the width of one bead blank at a time, the wrist-pin —82— being adjusted to effect this degree of movement of the metal strip so as to cut as many bead blanks therefrom as may be possible without undue waste.

*Means for cutting and cupping the bead blanks.*—The blanks for forming the beads are first cut to the desired form from the metal strip —b— and are then pressed into cup shape immediately following the cutting, and in order to accomplish these results the metal strip is fed between suitable die-plates —88— and —89—, both of which are mounted in a horizontal position in close juxta position one above the other upon a supporting block —90— on the bed or table —3—, the plate —89— being provided in its under side with the guide-way —65— and a suitable opening —91— of substantially the same form as the bead blank which is to be cut, while the die-plate —88— is provided in its upper face with a similarly formed recess —92— and a circular opening —93— of less diameter than the length of the elongated recess —92— and centrally thereof. Co-acting with the elongated recess —92— in the upper face of the die-plate —88— is a punching die —94— of substantially the same cross sectional form as that of the recess in which it is adapted to closely fit for cutting the bead blanks from the strip as the punching die —94— is forced downwardly. This punching die is hollow and is secured in the lower end of the vertically movable plunger —95— which is reciprocated by means of a cam —96— on the main driving shaft —4—, the upper end of the plunger being provided with an adjustable section —97— to facilitate the proper adjustment of the punching die —94— relatively to the die-plate —88— and is held in its adjusted position by a lock nut —98— and set screw —99—, the section —97— being provided with rollers —100— for engaging diametrically opposite sides of the cam —96—.

The plunger —95— is guided in vertical ways —101— and is provided with a central lengthwise socket —102— extending upwardly from its lower end for receiving and guiding the head —103— of a cupping plunger —104—, the latter having its lower end guided in the central opening in the punching die —94— through which it is adapted to be forced by mechanism presently described for forcing the previously cut flat bead blank through the circular opening —93— in the die-plate —88— and into a similar opening —105— in a horizontally movable slide —106—, the cupping of the blank following immediately after the cutting thereof from the strip of sheet metal by the die —94—, so that both operations are nearly simultaneous.

The cupping plunger —104— has at its upper end a grooved collar —107— fitting in a socket in the lower end of the head —103— and held in place by a key —108— which permits the plunger rod to be replaced in case it becomes broken without destroying the head —103—.

Figure 1:
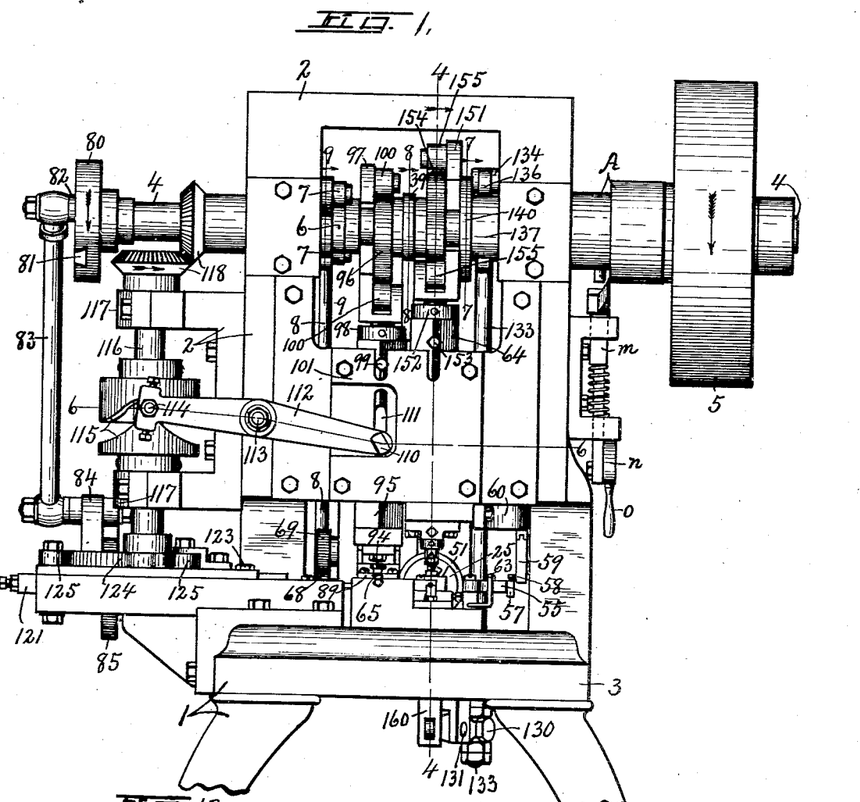
—Figure 1 is a front elevation of a machine for making bead chains and embodying the various features of my invention, the lower portions of the supporting legs being broken away.

A radial stud —110— is secured to the head —103— and projects outwardly through a vertically elongated slot —111— in one side of the plunger —95—and is attached to the adjacent end of a lever —112— of the first kind, as shown in Fig. 1. This lever is fulcrumed at —113— to the front face of the upright bracket —2— and has its other end provided with a stud or roller —114— engaged with a cam —115— which is secured to an upright shaft —116—for rocking the lever —112— and thereby reciprocating the cupping plunger —104—, the cam —115— being timed so as to force the plunger —104— down immediately following the cutting operation of the die —94—.

The shaft —116— is journaled in suitable bearings —117— on the upright bracket —2— and is driven from the main driving shaft —4— by bevel gears —118—, as shown in Fig. 1.

*Means for feeding the cupped blanks to the links.*—The thickness of the portion of the slide —106— having the pocket or opening —105— is sufficient to receive the entire cupped blank between its lower and upper faces into which position said cupped blank is forced by the plunger —104—. This slide —106— is guided in suitable ways on the block —90— in a horizontal plane just below that of the guides through which the wire links are fed and is reciprocated backward and forward to register its opening —105— alternately with the opening —93— in the die-plate —88— and with the previously formed links of the wire —a—, and for this purpose one end thereof is secured by a screw —120— to the adjacent end of a horizontally movable cross head —121— and is additionally held to its work by a brace-block —122— abutting against the adjacent end thereof and held in place by a clamping bolt —123—.

Figure 3:
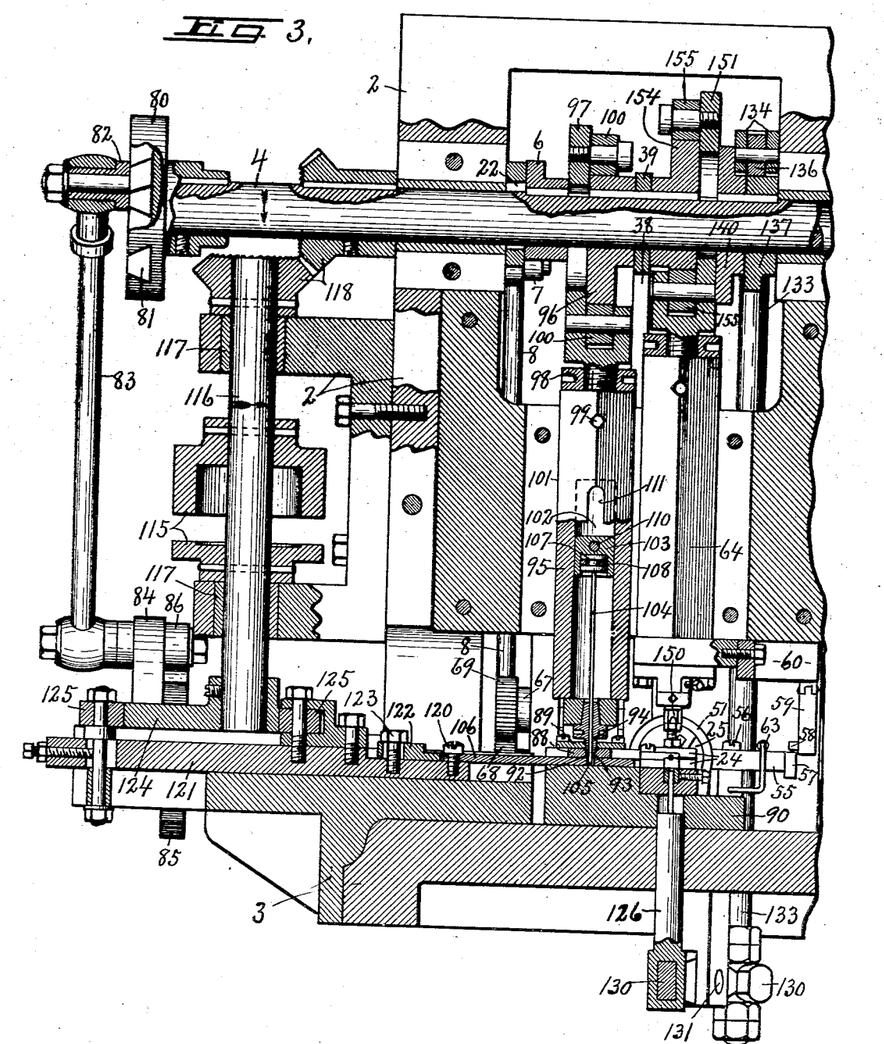
Figs. 3 and 4 are enlarged vertical sectional views, taken, respectively, on lines 3—3, Fig. 2, and 4—4, Fig. 1.

The means for reciprocating the crosshead —121— consists of a cam —124— secured to the lower end of the shaft —116— and engaged with diametrically opposite rollers —125— on the cross head, as shown more clearly in Fig. 3, the throw of the cam corresponding to the distance between the opening in the die-plate —88— and guides for the wire links, while the movement of the cross head is timed to register the opening —105— in the slide —106— with the corresponding opening in the die-plate —88— during the cupping operation and until the plunger —104— is withdrawn, whereupon the slide —106— is advanced to transfer the cupped blank to a position directly under the heads of the links to which it is to be applied ready for the final operation of closing the cupped bead upon said heads.

*Mechanism for closing the cupped bead blanks upon the links.*—As each cupped bead blank is transferred from the cupping dies into registration with the heads of the links and directly under the same in the manner previously described, it is forced upwardly out of the opening in the slide —106— by means of a plunger —126— which is guided in vertically registering openings —127— in the bed or table —3— and superposed block —90—, the upper end of the plunger being reduced to a diameter slightly less than that of the cupped bead blank and is guided in registering openings in additional blocks or plates —128—, its extreme upper end being concave to form a suitable seat for the bottom of the cupped bead blank so that when elevated it will force said cup around the heads of adjacent links.

The means for operating the plunger —126— consists of a lever —130— of the first kind fulcrumed at —131— to a bracket on the lower side of the table —3—, as shown more clearly in Fig. 4, and having one end engaged in a slot —132— in the lower end of the plunger —126— and its other end connected to the lower end of a vertically movable rod or pitman —133—. The upper end of this pitman is pivotally connected to a bell-crank lever —134— which is fulcrumed at —135— to the upright bracket —2— and has one of its arms provided with a roller —136— bearing against the periphery of a cam —137— on the main driving shaft —4—, said lever being provided with an additional arm —138— carrying a roller —139— for engagement with the periphery of a disk —140— which is also secured to the main driving shaft —4— and is provided with a flattened portion —141— to permit the inward movement of the roller —139— when the point of the cam —137— is in engagement with the roller —136—, the object of the disk —140— being to steady the action of the lever —134— and mechanism operated thereby.

Secured to the lower end of the plunger —64— is a bead crimping die —150— in vertical alinement with the upper end of the plunger —126— for closing the open side of the cupped blank around and upon the heads of adjacent links while the plunger —126— is still supporting said cupped bead blank around said heads, the lower end of the die —150— being provided with a spherical socket for wedging the open sides of the bead cup into close engagement with each other. The plunger —64— is similar to the plunger —95—, in that it is provided with an adjustable upper section —151— clamped in place by a lock nut —152— and set screw —153—. This plunger is reciprocated by means of a cam —154— secured to the main driving shaft —4— and engaging diametrically opposite rollers —155— on the section —151—, the cam being constructed so as to force the die —150— downwardly at the same time that the coöperating plunger —126— is forced upwardly, thereby effecting the application of the bead to the heads of adjacent previously formed links.

Immediately following the coöperation of the plunger —126— and die —150— upon the bead, during which the bead is forced out of the opening —105— and above the slide —106—, said plunger and die are withdrawn and the slide —106— is then returned to its starting position ready to receive another cupped blank, leaving the bead supported by the bar links of the wire which is then advanced another link space in the manner previously described for receiving the next bead cup, these operations being repeated in the formation of a chain of any desired length.

In order that the beads may be further finished to a more nearly perfect spherical form, I have provided an additional plunger —160— and coöperative die —161— carried, respectively, by the lever —130— and plunger —64— and arranged in advance of the plunger —126— and die —150— in the direction of feed of the links a distance corresponding to a predetermined number of spacing of the links, the only difference being that the lower end of the die —161— is provided with a semi-spherical socket corresponding to the approximately spherical socket in the upper ends of the plungers —126— and —160—, so that when the dies —160— and —161— are brought together upon opposite faces of the bead they impart to it a substantially perfect spherical form.

Figure 13:
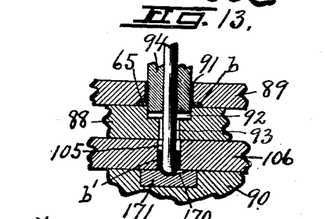
Fig. 13 is an enlarged detail sectional view of the bead cutting and cupping dies.
Figure 14:
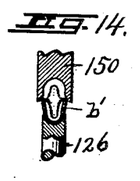
Figs. 14 and 15 are detail sectional views of the dies for closing and finishing the bead upon the links.
Figure 15:
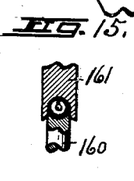
Figure 16:
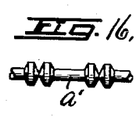
Fig. 16 is an enlarged elevation of portions of the cut links before separation.

As the flat bead blanks are pressed into cup-form by the plunger —104— and simultaneously forced into the opening —105— of the slide —106—, it tends to spring open against the sides of said opening and also tends to bind upon the end of the plunger, and in order to prevent its withdrawal with the plunger from the opening —105—, said opening is made a trifle larger than the die opening —93— in the superposed die —88—, as shown more clearly in Fig. 13 so as to form a shoulder at the adjacent ends of said openings to restrain the cupped blank as —b'— from upward movement out of the opening —105—, thus leaving the cupped blank in the slide —106— ready to be transferred to the links for application thereto.

As a further precaution against withdrawal of the cupped blanks from the slide —106—, its lower rounded end is forced through the lower side of the slide into contact with the forwardly inclined surface —170— on the upper face of a hardened —171— which is seated in the upper side of the block —90—.

The operation of my invention will now be readily understood with reference to the foregoing description and accompanying drawings, and it is evident that various changes may be made in the detail of construction of the various mechanisms without departing from the spirit of my invention, and therefore, I do not limit myself to the exact structure shown and described.

The pulley —5— may be loose on the shaft —4— and connected to and disconnected from said shaft by a clutch —A— which is controlled by a cam —n— through the medium of a slide-rod —m—, the cam —n— being provided with an operating handle —o— thus permitting the machine to be stopped and started at will.

What I claim is:

1. In a machine for making bead chains, the combination of a rotary link-heading device, means for feeding a wire intermittingly into said device to be operated upon thereby when the wire is at rest, dies for cutting bead blanks, means for intermittingly feeding a strip of sheet metal to the dies, additional means for cupping the bead blanks after being cut, means for feeding the cupped blanks into registration with the heads of the links, and a separate set of dies for closing the cupped blanks upon the heads of the links.

2. In a machine for making bead chains, a rotary cutter for forming links with end heads, means for intermittingly feeding a wire through the cutter, means for gripping the wire to hold it during the cutting operation, coöperative dies for cutting and cupping bead blanks, means for intermittingly feeding a strip of metal to said dies, additional means for feeding the cupped blanks into registration with the heads of adjacent links, and means for closing the cupped blanks upon said heads.

3. In a machine for making bead chains, a rotary cutter for forming links with end heads, means for intermittingly feeding a wire through the cutter, means for gripping the wire to hold it during the cutting operation, coöperative dies for cutting and cupping bead blanks, means for intermittingly feeding a strip of metal to said dies, additional means for feeding the cupped blanks into registration with the heads of adjacent links, means for closing the cupped blanks upon said heads, and means for additionally pressing the closed beads into spherical form after being operated upon by said closing means.

4. In a machine for making bead chains, a rotary cutter for forming links with end heads, guides at opposite ends of the cutter, means for intermittingly feeding a wire along said guides and into the cutter, means for holding the wire against movement during the cutting operation, coöperative dies for cutting and cupping bead blanks, means for intermittingly feeding a strip of sheet metal to said dies, additional means for feeding the cupped blanks into registration with the heads of the links, and coöperative dies for closing the bead blanks upon said heads.

5. In a machine for making chains, the combination of a rotary cutter having a central lengthwise opening therethrough and provided with means for cutting a wire into links and forming end heads thereon, means for intermittingly feeding a wire endwise in one direction through the cutter, coöperative dies for cutting and cupping bead blanks, means for intermittingly feeding a strip of sheet metal to said dies, means for feeding the cupped blanks into registration with the heads of the links, and separate means for closing the cupped blanks upon said heads.

In witness whereof I have hereunto set my hand this 25th day of January, 1915.

WILLIAM W. BRADLEY.

Witnesses:
  H. E. CHASE,
  ALICE M. CANNON.